United States Patent [19]

Lindgren

[11] Patent Number: 4,920,680

[45] Date of Patent: May 1, 1990

[54] LINE SETTER METHOD AND APPARATUS

[76] Inventor: Peter B. Lindgren, 871 S.W. 19th St., Boca Raton, Fla. 33486

[21] Appl. No.: 266,512

[22] Filed: Nov. 3, 1988

[51] Int. Cl.[5] ............................................. B66D 1/76
[52] U.S. Cl. ........................................ 43/4.5; 43/6.5; 43/27.4; 254/362
[58] Field of Search ................. 43/4, 4.5, 6.5, 27.4, 43/57.3; 254/291, 362, 392, 377

[56] References Cited

U.S. PATENT DOCUMENTS

| 3,034,767 | 5/1962 | Gordon | 43/8 |
| 3,037,720 | 6/1962 | Leithiser, Jr. | 242/155 R |
| 3,388,890 | 6/1968 | Born et al. | 254/361 |
| 3,765,614 | 10/1973 | Bartl et al. | 242/47 |
| 3,788,575 | 1/1974 | Boettcher et al. | 242/86.5 R |
| 3,949,969 | 4/1976 | Kaufer | 254/296 |
| 3,966,170 | 6/1976 | McKenna | 254/291 |
| 4,066,141 | 1/1978 | Elvin | 242/86.5 R |
| 4,234,167 | 11/1980 | Lane | 254/291 |
| 4,266,359 | 5/1981 | Alex | 43/6.5 |
| 4,482,133 | 11/1984 | Bishop | 254/291 |
| 4,644,678 | 2/1987 | Seres | 43/4 |

FOREIGN PATENT DOCUMENTS

1306894 4/1987 U.S.S.R. ............................. 254/291

Primary Examiner—Nicholas P. Godici
Assistant Examiner—Mike Starkweather
Attorney, Agent, or Firm—Jack E. Dominik

[57] ABSTRACT

A drive circuit for setter rollers is automatically coordinated with a spool drive to insure a condition of tension in a longline at all times during the setting operation. The apparatus includes various rollers to achieve the method, and in addition, circuits for controlling the motor adapted to drive the speed rollers at different but correlated rates of speed. While the fluidic circuit is hydraulic, alternative electronic controls may be employed.

23 Claims, 4 Drawing Sheets

LINE SETTER METHOD AND APPARATUS

BACKGROUND OF THE INVENTION

The present invention relates to longline fishing and, more particularly, to methods and apparatus for automatically setting monofilament longlines paid out from the stern of a fishing vessel from a spool around which the line has been wrapped.

SUMMARY OF THE PRIOR ART

Swordfish, tuna and a wide variety of other fish are taken around the world with many types of gear. The most common types of gear used are pole and line, purse seines, longlines, etc. The optimal gear varies with the fish sought, local currents, weather conditions and the economic limitations of the fishermen.

Longlines include a mainline, usually several miles in length, which is suspended generally horizontally beneath the water line by floats or buoys. The type of mainline used can affect the performance of the gear. Currently, rope is most commonly used, especially when used in conjunction with a line setter. Recently, there has been a significant movement to monofilament line because it fishes better. Monofilament line will not, however, work well with longline equipment of earlier designs. The small diameter of the monofilament line, its lighter weight, clarity, and its ability to stretch while under stress constitute reasons for its preference.

Boats normally fish with twenty to fifty miles of longline. Longline machinery usually includes a roller or spool supporting the necessary twenty to fifty miles of mainline. The spool is located in the fishing vessel to allow the mainline to be dispensed from the stern during the setting operation and to be retrieved by the same spool during the hauling operation. Commonly, rope mainline is coiled unsupported in a coil in the hold of the boat, and paid out from the hold.

Lengths of buoy line attach buoys to the mainline. The length of the buoy lines determines the depth of the mainline. Foam bullet buoys may be utilized for the buoys. The length of the buoy lines may range from ten to twenty fathoms and are preferably connected to the mainline with snap-on connectors. Inflated polyethylene balls and high fliers are periodically coupled with the mainline by buoy lines to assist in relocating the gear during the hauling operation. The high fliers include elongated upper sections which may carry radar reflectors or strobe lights to assist the fisherman during hauling.

Hooks are suspended from the mainline by hook lines or ganglions which are usually monofilament lines. The hook lines may be made of two monofilament sections coupled with a weighted swivel to help sink the hook and avoid tangles. The first section is often twenty to thirty fathoms in length and may be attached to the mainline with a snap-on connector. The second section is about one to ten fathoms in length and is attached to the hook and swivel. If the hook lines are made out of a single segment, they may vary from twenty to forty fathoms in length. The length of the buoy lines, the length of the hook lines, the distance between the buoys and the speed at which the mainline is set will determine the depth at which the fishing will occur.

Efforts have been made to throw or set mainlines from the sterns of moving boats with their buoy lines and hook lines attached. The only successful coiled unspooled line setters in use today are those which utilize rope as the mainline, the rope being driven through a pair of rollers, a driven roller and a cooperating idler roller. Such line setters store the rope in a horizontally disposed coil in the hold of the vessel from which it is pulled by the setter and dispensed from the stern of the boat while moving. Rope, however, for the desired strength, is excessively bulky and heavy. Its abrasive surface has a tendency to wear out the surfaces of the line setter rollers within two or three days of normal use. Moreover, the pulling of a line from a fixed flat coil induces an undesired twist into the line. Line twist is minimized when the line is stored on a spool. Storing twenty to fifty miles of bulky, heavy rope on a spool is impractical.

Although the benefits of small diameter, light weight, strong, monofilament line as the longline are apparent and recognized, efforts to implement longline setters with spooled monofilament have proven unsuccessful. This is due principally to the prior inability of line setter rollers to feed such line at a controlled rate of speed necessary to pay out the line at a rate equal to or exceeding the forward speed of the vessel. Further, the use of a supply spool for the support of the monofilament longline has also been met with the problem of controlling the movement between the spool and the setter, the two components of a longline system.

Various approaches are disclosed in the literature to improve the efficiency of feeding line from a supply and for controlling both the supply and the feeding mechanisms so as to effect the intended rate of feed. By way of example, note U.S. Pat. Nos. 3,750,970 to Tremoulet and 3,765,614 to Bartl. Both describe apparatus for dispensing and retrieving lines from a fishing boat. Each disclosed apparatus utilizes one drive roller at the stern of the boat for dispensing or retrieving line from a horizontally disposed coil resting at the center of the boat. Additional patent disclosures show methods and apparatus wherein the speed of cable dispensing is a function of the vehicle speed. Note U.S. Pat. No. 4,066,141 to Elvin and European Patent Application No. 8,352 to Western Gear. According to these patents, the cable dispensing speed may be controlled by the tension on the line or the depth of the line being dispensed. Note also U.S. Pat. Nos. 2,732,095 to Gratzmuller; 3,788,575 to Boettcher; 3,291,095 to Nicherson and 3,037,720 to Leithiser. And lastly, U.S. Pat. No. 3,949,969 to Kaufer discloses the use of a cable winch having a plurality of rollers for the feeding of rope with control of the winch driving being a function of tension in the cable.

SUMMARY OF THE INVENTION

The present invention evolved from the proposition that to properly set a longline it must be paid out over the stern of the fishing vessel at a speed the same as or in excess of the forward speed of the fishing vessel. In accordance with the method, the line is reeled off of a spool upon which it is wound, and power driven through a plurality of rollers. The rollers are ideally powered hydraulically with one roller having a speed coordinated with another, and a feedback to the spool roller which is a direct function of the tension in the line between the spool roller and setting rollers. While the line is between the spool and the line setter it is vulnerable to a speed coming off the spool which exceeds the speed of withdrawal by the setter which invariably induces backlash. Thus tension must effectively exist in the line between the spool and setter to insure smooth pay out and absence of backlash. Because the line is elastomeric, overrunning can occur during acceleration, deceleration, start up, stop, and uneven winding. The invention relates to a drive circuit for the setter rollers which is automatically coordinated with the spool drive to insure a condition of tension in the line at all times during the setting operation. The apparatus of the invention includes the various rollers to achieve the foregoing method, and in addition circuit means for controlling the motor adapted to drive the speed rollers at different but correlated rates of speed. While the fluidic circuit as shown is hydraulic, alternative electronic controls are contemplated, but believed to be of secondary value in view of the highly corrosive and sometimes adverse environmental conditions in which the subject longline setting method and apparatus will be employed.

In view of the foregoing, it is a principal object of the present invention to provide a method for longline setting in which the longline is paid out at a speed coordinated to the forward speed of the vessel in order to achieve the depth of line or catenary form between the buoys as is predetermined by the persons in control of the vessel.

A related object of the invention and importantly so is the provision of the apparatus construction in such a fashion that it can be similarly used for hauling the line.

Yet another object of the present invention is to provide an apparatus useful in the particular method in which the apparatus inherently can contain, on a single spool, a longline monofilament of fifty miles or more in length.

Still another object of the present invention is the development of longline setting apparatus which is relatively economical to fabricate, highly durable in operation, and susceptible of "maintenance afloat" for the bulk of the inhibiting problems which may occur in operation.

BRIEF DESCRIPTION OF THE DRAWINGS

Further objects and advantages of the present invention will become apparent as the following description of an illustrative embodiment takes place, in which.

DETAILED DESCRIPTION OF PREFERRED EMBODIMENTS

Figure 5:
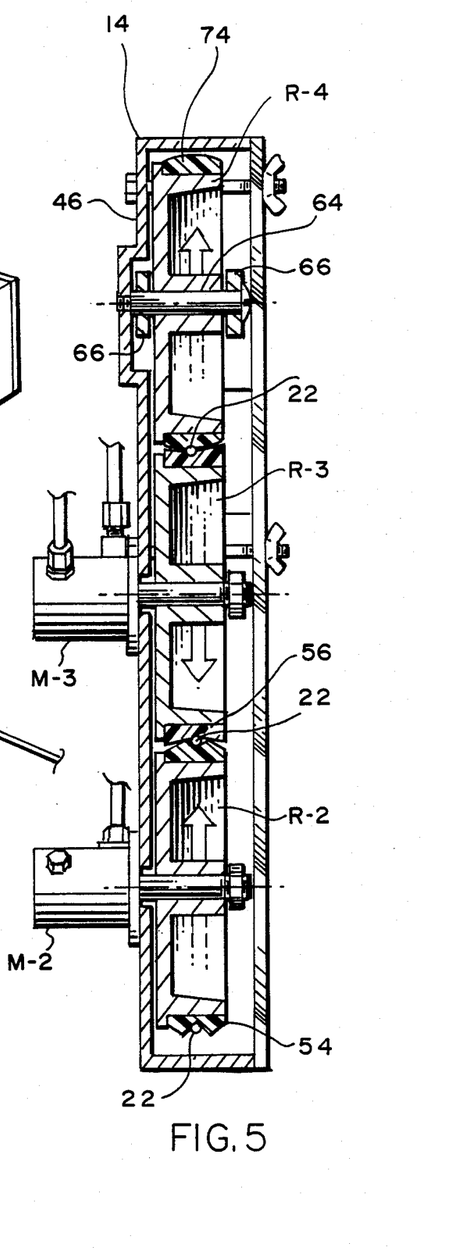
FIG. 5 is a sectional view taken along line 5—5 of FIG. 3.
Figure 6:
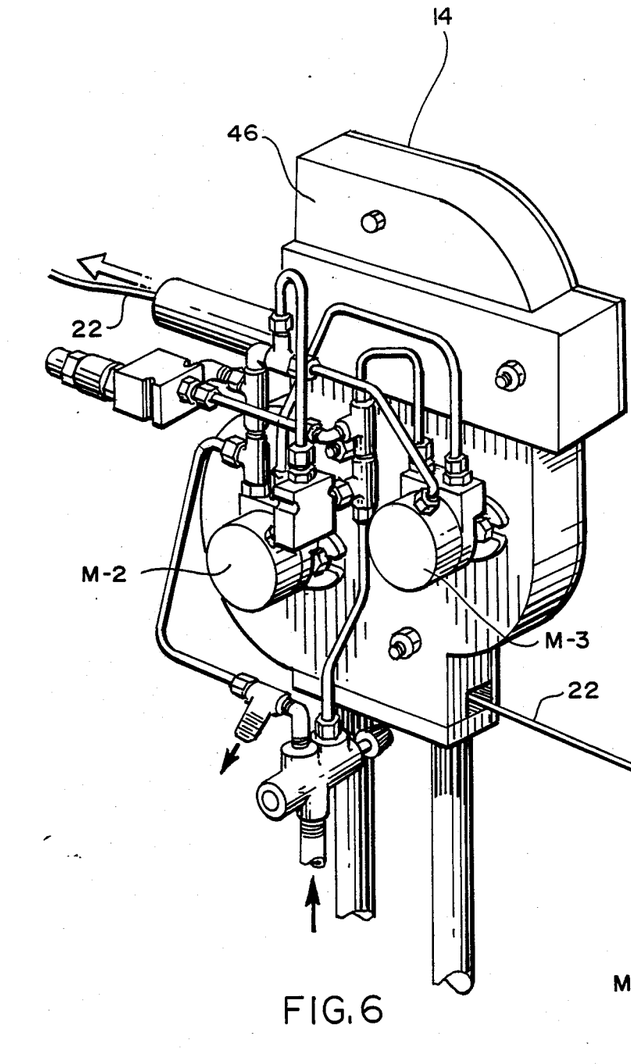
FIG. 6 is an enlarged perspective illustration of the line setting apparatus of the prior Figures but shown from the opposite side.

With reference to the drawings, there is shown in FIGS. 5 and 6 a fishing boat 10 with the longline system 12 in which the invention may be used. The system 12 relates to the line throwing apparatus or setter 14 and a supply spool 16. Also shown is an operator 18 monitoring the operation of the system. In addition to line setting, the system may be used for retrieving or hauling the longline 22 previously set in the water after the fishing has been completed. In such case, the longline 22 would be shown as extending directly from the water to the motor driven spool 16 over a horizontally reciprocating line leveler 24 to insure that the line is placed on the spool in an even manner. The setting apparatus 14 is not utilized during retrieval. During such hauling activity, the spool 16 of the present invention functions in a more conventional mode. The present invention, as shown in FIGS. 1 and 2, is configured for dispensing or setting longline 22 from the supply spool 16 for use in longline fishing.

Figures 1, 2:
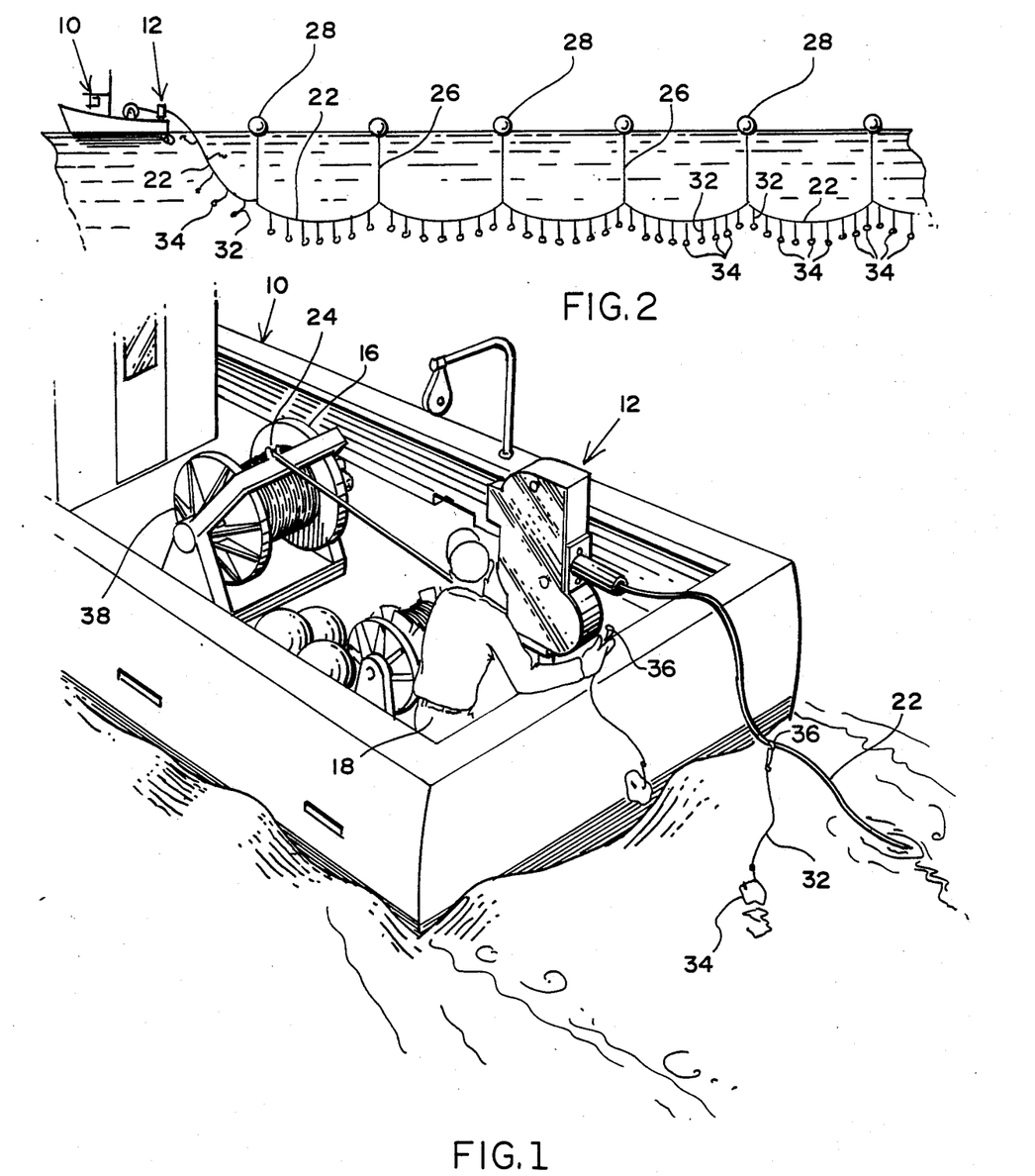
FIG. 1 is a perspective illustration of a fishing boat equipped with a longline setting system constructed with the principles of the present invention.
FIG. 2 is an elevational view of the boat and line setting apparatus of FIG. 1.

A side elevational view of the longline being set from the fishing boat can best be seen in FIG. 2. The longline is in a generally horizontal orientation supported from above by generally vertically extending buoy lines 26 with supporting buoys 28 at their upper ends. Extending vertically downwardly from the longlines are a plurality of hook lines 32, or ganglions as they are commonly called, which are spaced more frequently along the longlines than are the buoy lines 26. Attached to the lower ends of hook line 32 are weights 34. These weights 34 serve to stabilize and position long line 22. Clips 36 (see FIG. 1) may be used for coupling and uncoupling the buoy lines 26 and hook lines 32 with respect to the longline 22. As shown in FIG. 2, the bated hooks 34 then string out for the length of the longline 22.

The longline is stored on a spool formed of a roller R-1 with side flanges 38 for containing the spooled longline. The roller R-1 is operatively coupled with a motor M-1 to positively drive the roller R-1 for spooling the longline during retrieval or hauling of the longline after fishing. The motor M-1 may be short circuited during the longline setting operation so that the spool may freely rotate or freespool. During such condition, the longline will be dispensed in response to the line being pulled by the setter 14. During the setting of longline, the longline is monitored for tension and the motor M-1 may induce a drag or resistance on the spool as a function of the monitored tension in the line between the spool and setter.

Figures 3, 4:
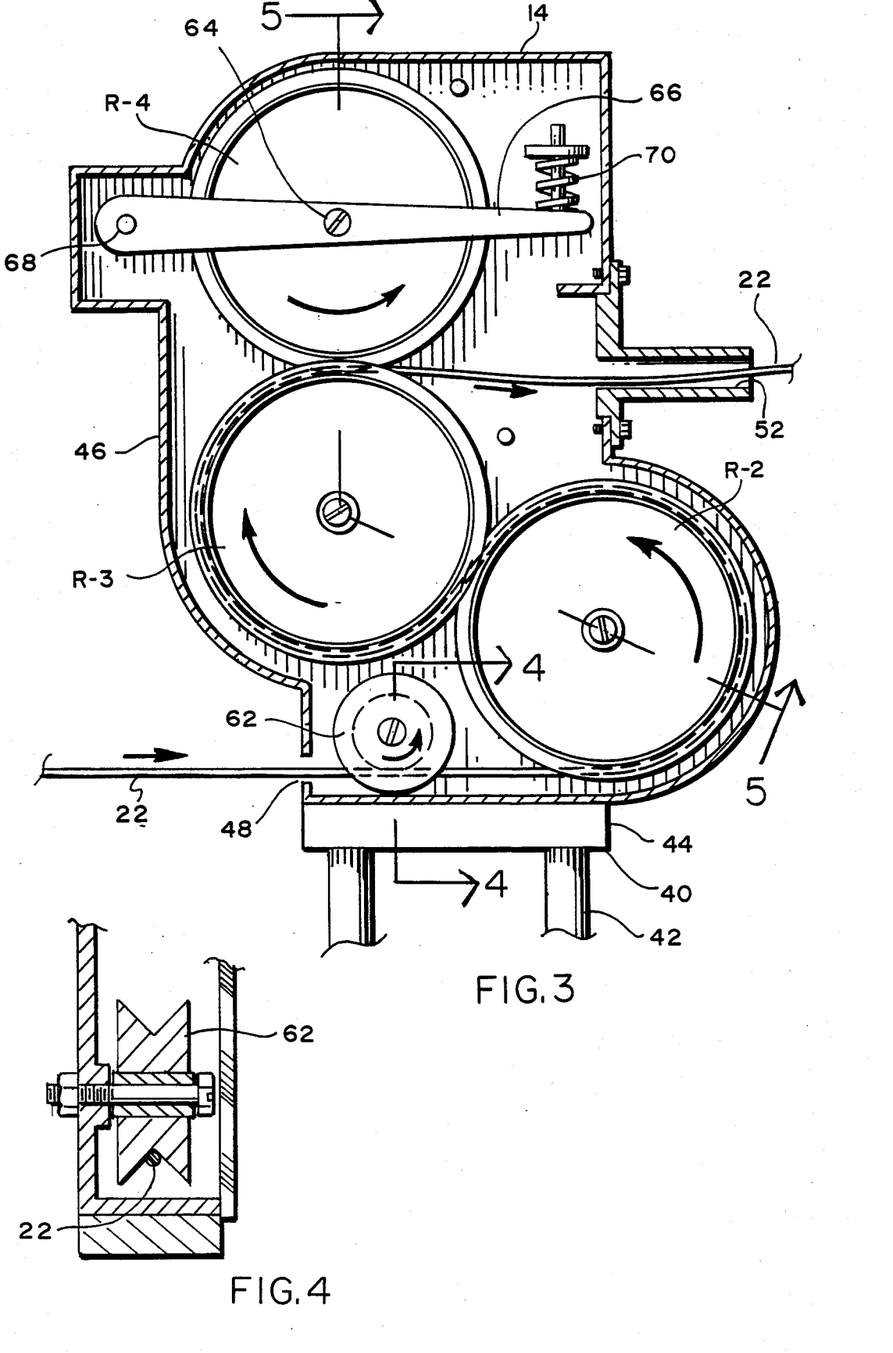
FIG. 3 is an enlarged side elevational view of the line setting apparatus of FIGS. 1 and 2.
FIG. 4 is a sectional view taken along line 4—4 of FIG. 3.

The setting apparatus or setter, as more clearly seen in FIGS. 3, 5 and 6 is located on a stand 40 with legs 42, a base plate 44 and housing 46. The housing 46 is formed with an input orifice 48 for receiving line 22 from the spool 16 and an exit orifice 52 in the form of an elongated barrel from which the line is thrown or set. Within the setter are a pair of drive rollers R-2 and R-3 with associated motors M-2 and M-3. The first drive roller R-2 is the entrance drive roller while the second driven roller R-3 is the exit drive roller. These driven rollers are fabricated of a rigid metallic material. They are provided at their periphery with the elastomeric sleeves 54 and 56 with concave recesses which are replaceable after wear as occurs through prolonged use. These driven rollers are of a similar diameter. In order to provide for proper operation, however, they are driven at different speeds through the arrangement of their motors M-2 and M-3.

A first idler roller 62 is provided adjacent the inlet orifice 48 for defining the path of movement of the line 22, while a second idler roller R-4 is located in operative association with the exit drive roller R-3 to insure the proper feeding of the line 22 being set. The idler rollers R-4 and 62 are freely rotatable about their support shafts. The second idler roller R-4 has its support shaft 64 mounted at its ends on support struts 66 which are pivotally mounted in the setter housing or pin 68. The other ends of the struts 66 are biased downwardly by spring 70 to maintain a predetermined pressure on the longline 22 fed between the exit drive roller R-3 and its associated idler roller R-4. Like the drive rollers R-2 and R-3, the idler roller R-4 is provided with an elastomeric sleeve 74. Such sleeve, however, has a convex surface, rather than the concave surface of the drive rollers, so that the fed line may be retained in proper position therebetween.

There are four major functioning rollers utilized in the operation of the present inventive line setting system. They are indicated as R-1, R-2, R-3 and R-4. The first three rollers have fixed axes of rotation and associated motors indicated as M-1, M-2 and M-3. The further roller R-4 is free-floating and is not directly driven by a motor.

The longline 22 to be thrown or set is initially positioned on the first roller, R-1 of the supply spool 16 which is operatively associated with its associated motor M-1. The motor M-1 functions to drive roller R-1 to pull the line from the water during hauling of the longline. During normal line setting, the motor M-1 controls roller R-1. Motor M-1 is normally closed circuited. It receives a signal from the setter 14 to indicate that the line 22 has sufficient tension and no slack between the setter and supply spool. When tension decreases between the setter 14 and supply spool 16, it is detected at the setter 14 and a signal is sent to motor circuit M-1. The signal is a function of the tension detected at the setter. The signal causes motor circuit M-1 to modulate providing the correct restrictive drag force on roller R-1 for proper setting. Such an arrangement compensates for setter drive roller speed and changing spool diameter and other variables.

Roller R-2 is the entrance drive roller while R-3 the exit drive roller. Roller R-4 is a spring loaded idler which contacts the fed longline 22 to ensure the proper dispensing or throwing of the longline 22 from the setter 14. Motor M-2 is associated with roller R-2 and motor M-3 is associated with roller R-3. The operator has a manually operated control 76 controlling the output flow from pump 78 to vary the speed at which motors M-2 and M-3 are driven and hence the rate at which the line is dispensed from the setter. The adjustment and setting of control 76 by the operator is a function of the speed of the boat, the desired depth of the longline in the water during fishing, and the intended amount of sag of the longline between buoy lines 26. The control 76 is set by the operator to directly allow energizing motors M-2 and M-3 through the flow of oil through lines 80, 82 and 84 to dispense longline at the desired rate.

For proper operation, it has been found that it is important that motor M-3 drives roller R-3 at a speed greater than R-2. This is done through motors functioning at different speeds or even with a common motor with variations in the diameters of the driven rollers. In practice, however, it has been found that the preferred way is to use a fluidic circuit 86 and bleed the output fluid from motor M-3 by line 82 so that the lesser driving fluid flows by line 80 to motor M-2 which, by definition, will maintain motor M-2 at a speed less than motor M-3.

The fluidic circuit also functions to control the supply spool R-1 to preclude reduced tension or slack between rollers R-1 and R-2 which usually results in line being undesirably deposited on the deck of the boat. The optimum approach is achieved by maintaining a predetermined degree of tension in the line between rollers R-1 and R-2. This objective is preferably effected by monitoring the fluid flowing into and out of motor M-3 so that spool R-1 free-wheels only so long as there is sufficient fluidic drive pressure at the input line to motor M-3. As long as there is enough pressure into motor M-3, then spool R-1 will free-wheel. If, however, there is less than a predetermined fluid pressure into motor M-3 as caused by a reduced tension in the longline between the supply spool and setter, such decreased tension is sensed by motor circuit M-1 to energize and induce a drag into roller R-1 and spool 16 to the correct line condition. The line could sag and drop on the deck in the event of a sudden snap in the supply spool or if there excessive inertia as caused by improperly overlapping lines in the supply.

The higher the pressure inputting motor M-3, the greater will be the pilot pressure to the counter balance valve 102 controlling M-1. The normally closed valve 102 opens with an increase in pilot pressure as sensed from the input line 84 to motor M-3. The pressure at the input line of motor M-3, which controls motor M-1, varies continuously as longline is being set. When the spool is full of longline, about four-hundred pounds (400 lbs.), pilot pressure to motor M-1 is generated to effectively constitute a proper pilot pressure. When the spool is substantially depleted of monofilament line, the flanges 38 of the supply spool 16 act as fly wheels and thus up to one-thousand (1,000) psi may be the pilot pressure opening the counter balance 102. Referring to the fluidic circuit 86 schematically illustrated in FIG. 7, main drive motor M-1 is coupled with the longline spool or spool R-1, a storage spool for twenty to fifty miles of monofilament line. Spool R-1 is positively driven by motor M-1 during the hauling mode while its control valve is fully open. The spool will, however, freespool during line setting so long as proper tension is in the longline between the supply and the setter as detected by the monitoring of the fluid setter motor. But drag may be induced in the spool R-1 through motor M-1 as needed for smooth setting of the longline.

Figure 7:
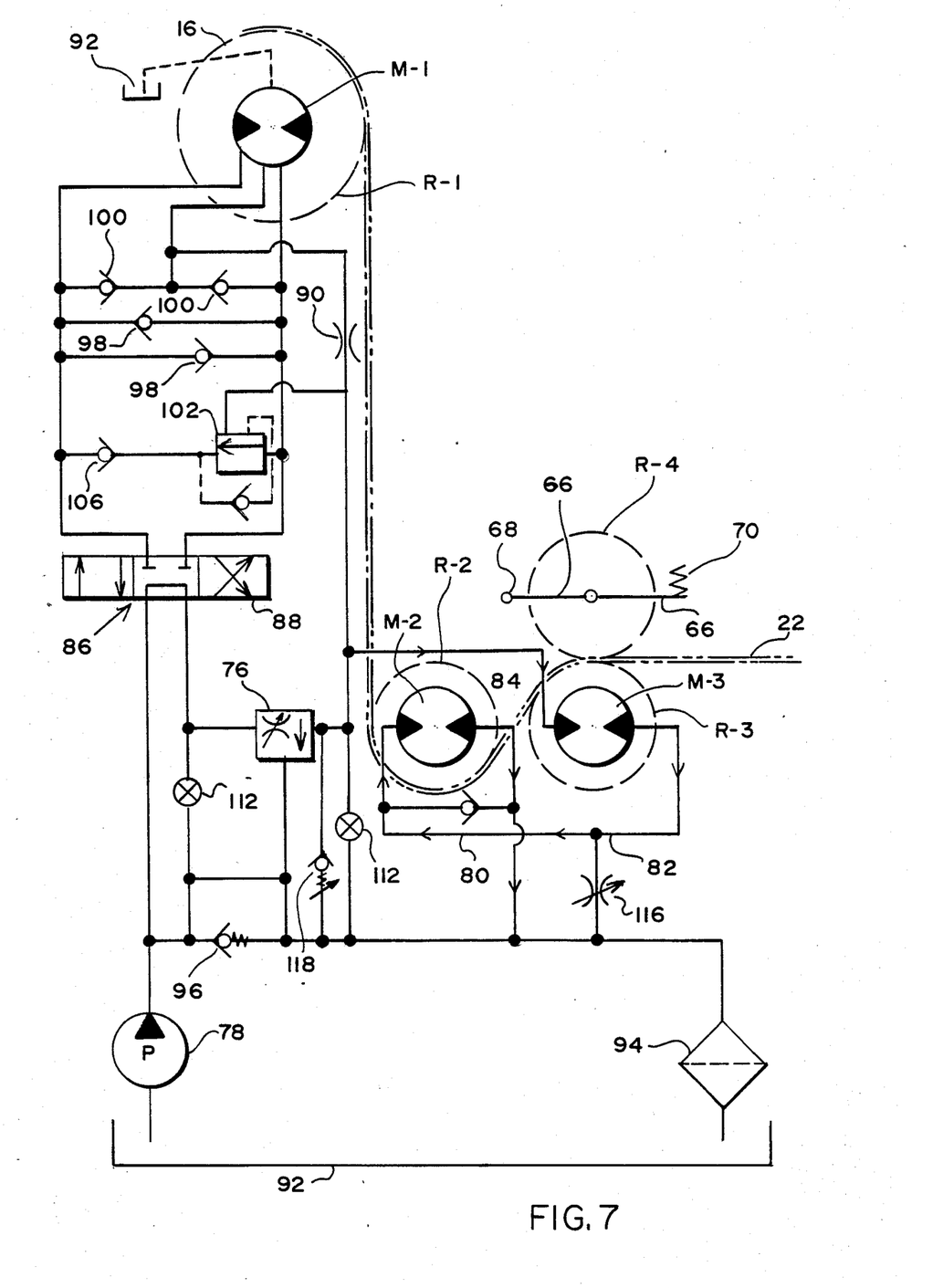
FIG. 7 is a circuit diagram for controlling the operation of the line setting apparatus illustrated in the prior Figures.

The motor M-1 acts as a conventional motor. It may be controlled by a standard tandem spool, four-way hydraulic directional control valve 88. The valve 88 provides a forward and reverse control for hauling when the line setter is not being used. Also associated with the spool motor M-1 is an anti-cavitation check provided by one way valves 100 which are in the circuit for motor protection should the motor ever get starved for oil as required for that type of motor. A hydraulic needle valve 90 or bleeder type control is in the circuit to circulate fresh cool oil through the bottom of the case of the motor. It also ensures that the motor has oil in order to preclude cavitation. Hydraulic pump 78 effects the movement of the fluid from the reservoir 92 to the various component elements of the fluidic circuit 86. It may be of several different makes or models, fixed or variable displacement. The present device requires 9 to 12 gallons per minute of hydraulic flow at 1000 psi minimum. All well known pumps with these properties are acceptable, whether piston, vane, or gear type pumps. Such pumps are made by Vickers, Cessna, Gresen, Commercial Shearing, Dennison and others. A hydraulic filter 94 is located in advance of the reservoir 92 and functions to filter the oil of the fluidic circuit.

High-pressure hydraulic safety relief valve 96 functions for safety relief purposes only. Also located in operative proximity with the motor M-1 are high-pressure relief valves 98 which relieve oil in the forward position. It is for protection of motor M-1 and high-pressure protection for the circuit 86.

Component 102 is a counter-balance metering valve. It is this metering valve which is used to control the free-wheeling of the spool. It is normally closed to fluid flow from its input port to its output port. It opens increasingly with increasing pilot pressure as detected at the line setter. Check valve 106 is in series with the counter-balance metering valve 102 and functions to defeat the check valve within the counter-balance metering valve 102 since most counter-balance valves come with an internal check valve. There is a coordinating function of counterbalance valve 102 by way of the pressure drops across the effected components M-1, M-2 and M-3. Thus M-1 is the drive for the spool, and M-2 and M-3 are the drives for the setter. Hereinafter we deal with the pressure drops on M-1 and the M-2, M-3 setter pressure drop.

$\Delta P1$ = Pressure drop across M-1 = Pressure drop across controlled flow ports of the counterbalance.

$\Delta P2$ = Pressure drop across the line setter.

T = Tension in the fishing line between the spool M-1 and the line setter.

When the line setter begins to turn as controlled by the operator, T is zero or slack line is probably present. $\Delta P1$ is low and $\Delta P2$ is low and the counterbalance as controlled by $\Delta P2$ is closed.

When the fishing line tightens, $\Delta P2$ rises to the required amount to pull the line overboard. Line tension then attempts to rotate the spool and M-1, causing M-2 to pump hydraulic oil to the counterbalance 102 at $\Delta P1$. The counterbalance 102 has a minimum preset pressure requirement of approximately 400-500 psi before it will open to allow flow and rotating of the spool. The line setter as described, pulls approximately T=65 pounds to produce the minimum $\Delta P2$ for counterbalance 102 to allow any oil flow in the unreeling direction. T is produced by 5.4 cubic inches motors with a 9 inch diameter roller. At this minimum operating condition $\Delta P1$ is approximately 700 psi as produced by a typical 36 inch diameter full spool with a 12 cubic inch drive motor.

As setting speeds increase, M-1 and the line spool rotate much faster. Frictional losses in the line spool and motor become higher and $\Delta P2$ rises above the minimum requirement for unreeling Counterbalance 102 then opens further and $\Delta P1$ begins to drop. Counterbalance 102 then modulates to insure the minimum required tension.

As the spool is depleted of line the unreeling diameter is decreased and the spool rotational speed increases (setting speed remains constant). With still higher frictional losses, still higher T develops as high as approximately 130 pounds and $\Delta P2$ to 1000 psi. Counterbalance 102 then is fully open and P1 drops to the hydraulic losses of the fully open circuit.

The circuit will then maintain the T to 65–130 pounds driving normal operating conditions as required for smooth operating compensating for high and low fishing line speeds and during acceleration and deceleration.

Coupling the fluidic circuit elements of the supply spool motor M-1 and the fluidic circuit elements of the drive roller motors M-2 and M-3 is a hydraulic flow control valve 76. Control valve 76 passes the oil from the pump circuit and sends the desired amount of oil to the line setter for obtaining the desired preset speed. It then diverts the excess oil back to the reservoir 92. Elements 112 are ball valves. They are used to short circuit the line setter oil to the reservoir 92 for stopping the line setter. Adjacent to motors M-2 and M-3 is a flow control valve 116 and a relief valve 118. Valve 116 allows some oil to bypass motor M-3 such that it will run slower than motor M-2. The counterbalance valve 102 may be obtained from several manufacturers such as Modular Controls, Snap Tight, and Sun Hydraulics, Counterbalance ratios between 3:1 and 5:1. The relief pressure is normally set to operate between 2,000 and 2,500 pounds. The check valves 98, 100 employed are conventional. The pressure relief valves 96, 118 can be purchased from Hydroforce of Northbrook, Illinois, the flow control valves 76 are available from Fluid Power Systems of Wheeling, Ill., and the filtration of the hydraulic system can be accomplished by filters 94 from Gresen Hydraulic of Green Manufacturing Company of Minneapolis, Minn.

As to the rollers, the idling top roller R4 is normally formed to have a standard polyurethane wear surface. It is then cut to shape. The center roller R3 or drive roller is formulated a lower surface of a thermosetting-type rubber commonly used in retreading automotive tires. A good source of such material is Apex. Finally, the lower roller R2 has a wear surface which is a form of a thermoplastic-type material and is obtainable from Monsanto Chemical in St. Louis.

The above-described fluidic circuit constitutes the primary or preferred embodiment of the invention for effecting the intended functioning of the line setting system, supply spool, and setter. Each and every function, however, could readily be accomplished by other controlling elements, whether fluidic, mechanical, electro-mechanical, electrical (analog or digital), etc. The use of the fluidic circuit as herein described has been found to function most efficiently and reliably for its intended purposes in the less than optimal environment of a fishing boat deck.

The method of the present invention relates to setting mainline 22 of a longline fishing system and comprises the steps of supporting on a supply spool 16 the mainline to be set; setting mainline from the spool by setter drive rollers R-2 and R-3; while the mainline is being set, monitoring the amount of tension in the mainline between the supply spool 16 and the setter drive rollers R-2 and R-3; and varying the drag in the spool as a function of monitored tension. The monitoring is effected by a fluidic circuit 86 which feeds fluid to a motor M-2 for a first drive roller R-2 and then to motor M-3 for a second drive roller R-3 and senses the pressure of the fluid. The sensed input pressure will holds counterbalance valve 102 in a first orientation to allow the spool 16 to rotate so long as the sensed input pressure is above a predetermined level. However, counterbalance valve 102 will modulate to create a drag or restriction to the spool 16 as a function of decreased sensed pressure.

The method further includes the steps of providing an entrance setter drive roller R-2 and an exit setter drive roller R-3; training the line 22 to be fed around the setter entrance drive roller R-2, a zone wherein the surfaces of the drive rollers R-2 and R-3 are in operative proximity, and then the setter exit drive roller R-3. The entrance drive roller R-2 is then driven at a first surface speed and the exit drive roller R-3 at a second surface speed which is greater than the first speed. In addition, spring biasing an idler roller R-4 into operative proximity with the exit drive roller R-3 feeding the line at a surface speed essentially equal to the second surface speed. The line 22 wraps around more than 180 degrees of each drive roller R-2 and R-3. The drive rollers R-2 and R-3 are driven by motors M-2 and M-3 energized through a fluidic circuit 86 with the fluid output of one motor M-3 constituting the fluid input of the other motor M-2. The drive rollers R-2 and R-3 include elastomeric sleeves 54 and 56 with concave surface and the idler roller R-4 includes an elastomeric sleeve 74 with a convex surface 22 nested within the concave portion of exit drive roller R-3.

The method further includes the steps of imposing a proportionate drag on a line 22 being pulled from spool 16 by providing spool 16 capable of freespooling but capable of being imposed with a proportionate drag; pulling line 22 from the spool 16; monitoring the line tension required to pull the line 22 at a predetermined final speed; and imposing a proportionate drag on the spool 16 as a function of the monitored tension. The counterbalance element 102 has an initial pressure setting adapted to allow the spool 16 to freespool, and a second pressure setting adapted to impose a drag on the spool 16.

The present invention includes that contained in the appended claims as well as that of the foregoing description. Although this invention has been described in its preferred form, it is understood that the present disclosure of the preferred form has been made by way of example and numerous equivalent elements or circuits of construction and arrangement of parts may be resorted to without departing from the spirit and scope of the present invention.

What is claimed is:

1. A method of setting mainline of a longline fishing system including a fishing vessel having a forward speed, a supply spool, payout rollers, and a drive roller comprising the steps of:
   winding the mainline to be set on a cylindrical supply spool,
   removing the line from the supply spool by drive rollers thereby inducing a tension in the mainline,
   sensing the tension in the mainline while the same is being set to determine an empirical tension for maintaining a tension on the line from the cylindrical supply spool and the drive roller, and driving the payout rollers at a speed which is the same as or greater than that of the forward speed of the fishing vessel.

2. In the method of claim 1,
   utilizing a fluidic circuit to feed a motor for a first drive roller with a first drive roller pressure, and then directing the fluid to a second drive roller with a second drive roller pressure and sensing the relative pressures between the two drive roller pressures to insure that the payout drive slightly exceeds that of the one feeding.

3. A method of imposing a proportionate drag on a line being pulled from a spool for longline payout on a fishing vessel having a forward speed and setting comprising the steps of:
   forming a spool of freespooling and capable of being imposed with a proportionate drag,
   winding a monofilament line around said spool which line can be pulled off the spool by applying a force,
   monitoring the force required to pull the line off the spool at a predetermined final speed which creates a payout speed in excess of the forward speed of travel of the fishing vessel,
   and imposing a proportionate drag on the spool as a function of the monitored force.

4. A method of setting mainline of a longline fishing system, comprising the steps of:
   providing a supply spool with means for controlling its unwinding mode from free wheeling proportioned to full stop having an intermediate drag,
   unreeling from a supply spool the mainline to be set,
   setting the mainline from the spool by setter rollers,
   while the mainline is being set, monitoring the amount of tension in the mainline between the supply spool and the setter rollers, and
   varying the drag on the spool as a function of the monitored tension.

5. The method as set forth in claim 4, wherein the monitoring is effected by a fluidic circuit which feeds fluid having a pressure to a motor for a first drive roller and then to a motor for a second drive roller and senses the pressure of the fluid.

6. The method as set forth in claim 5, wherein the sensed pressure holds a modulating valve in a first state to allow the spool to rotate freely so long as the sensed pressure is above a predetermined limit but modulates the valve to create a restriction to the spool as a function of a lowering of the sensed pressure below the predetermined limit.

7. A method of feeding a monofilament line from a supply comprising the steps of:
   providing an entrance drive roller and an exit drive roller,
   training the line to be fed around the entrance drive roller, then passing the line through a zone wherein the surfaces of the drive rollers in operative proximity, and then training the line on the exit drive roller,
   driving the entrance drive roller at a first surface speed and the exit drive roller at a second surface speed which is greater than the first speed, and
   biasing an idler roller into operative proximity with the exit drive roller to feed the line at a surface speed essentially equal to the second surface speed.

8. The method as set forth in claim 7, wherein the line extends around more than 180° of each drive roller.

9. The method as set forth in claim 7, wherein the drive rollers are driven by motors energized through a fluidic circuit with the fluid output of one motor constituting the fluid input of the other motor.

10. The method as set forth in claim 7, wherein the drive rollers include elastomeric sleeves with concave surface and the idler roller includes an elastomeric sleeve with a convex surface located within the exit drive roller with the line located therebetween.

11. A method of imposing a proportionate drag on a line being pulled by a force from a spool, comprising the steps of:
    providing a spool capable of freespooling but capable of being imposed with a proportionate drag,
    pulling line from the spool,
    monitoring the force required to pull the line at a predetermined final speed, and
    imposing a proportionate drag on the spool as a function of the monitored force.

12. The method as set forth in claim 11, and further including the step of providing a modulating element having a first orientation adapted to allow the spool to freespool and a second orientation adapted to impose a drag on the spool.

13. The method as set forth in claim 12, wherein the modulating element is part of a fluidic circuit.

14. A longline fishing system, a mainline for use in said system, and means for setting the mainline comprising
a supply roller supporting the mainline to be set,
a mainline setter having drive rollers to pull mainline under tension from the supply roller at a first speed while the drive roller is moving at a second speed,
means to monitor the amount of tension in the mainline between the supply roller and the mainline setter while the mainline is being set, and
means to reduce any tension between the supply roller and the mainline setter when the monitored tension has increased to beyond a predetermined level.

15. The system as set forth in claim 14, wherein the means to monitor is effected by a fluidic circuit which feeds fluid under pressure to a motor for a first drive roller and then to a motor for a second drive roller and senses the pressure of the fluid.

16. The system as set forth in claim 15, and further including, in the fluidic circuit, a modulating valve having a first state to allow the supply roller to rotate freely so long as the sensed pressure is above a predetermined limit but will adjust the modulating valve to create a drag in the spool if the sensed pressure falls below a predetermined limit.

17. Apparatus for the feeding of a line from a supply comprising:
an entrance drive roller and an exit drive roller oriented for receiving the line to be fed with the line being positioned around a portion of the entrance drive roller, the line then passing through a zone wherein the surfaces of the drive rollers are in operative proximity, and then the line passing over a portion of the exit drive roller,
means to drive the entrance drive roller at a first speed and the exit drive roller at a second speed which is greater than the first speed, thereby inducing tension in the line between the entrance drive roller and exit drive roller;
means for monitoring the induced tension, and control means translating said monitored tension into differential speed control between the entrance and exit rollers to maintain the speed of the exit roller in excess of the entrance roller speed, and
a biased idler roller in operative proximity with the exit drive roller to insure the feeding of the line at a speed essentially equal to a second speed.

18. The apparatus as set forth in claim 17, wherein the line extends more than half way around each drive roller.

19. The apparatus as set forth in claim 17, and further including motors for driving the drive rollers, the motors being energized through a fluidic circuit having a fluid input and a fluid output with the fluid output of one motor constituting the fluid input of the other motor.

20. The apparatus as set forth in claim 17, and further including elastomeric sleeves with concave surface on the drive rollers and an elastomeric sleeve on the idler roller with a convex surface located within the exit drive roller and with the line located therebetween.

21. Control means to periodically induce a drag on a line or a spool being pulled by drive rolls having drive means inducing a drive force on the line comprising:
means for inducing a retarding force on the spool,
means to monitor the drive force required to pull the line at a predetermined fixed speed, and
means to initiate the retarding force on the spool to thereby eliminate any slack in the line between the drive means and the spool whenever the monitored drive force drops below a predetermined level.

22. The control means as set forth in claim 21, and further including a fluidic circuit having a valve with a first orientation adapted to allow the spool to freespool and a second orientation adapted to impose a drag on the spool.

23. A longline fishing system for a boat having a rear portion and moving at a rate of speed for setting a line from the rear of the boat at a rate of speed greater than the rate of speed of the boat comprising:
a freely rotatable spool adapted to be supported on the boat for retaining a supply of line to be dispensed and a first motor operatively coupled with the spool for periodically providing a retarding force to the spool,
a line setter having a pair of drive rollers positionable adjacent to the rear of the boat for receiving the line under tension from the spool and for dispensing the received line from the boat at a rate of speed greater than the rate of speed of the boat and additional motor means for driving the drive rollers, and
fluidic circuit means controlling the additional motor means and adapted to drive the drive rollers at different but correlated rates of speed, the fluidic circuit means also adapted to monitor the tension in the line at the line setter, the fluidic circuit means also coupling the first motor and the additional motor means for continuously monitoring and inducing a drag on the spool through the first motor when decreased tension in the line is sensed at the line setter.

* * * * *